(12) United States Patent
Olesen et al.

(10) Patent No.: US 7,092,486 B2
(45) Date of Patent: Aug. 15, 2006

(54) SYSTEM AND METHOD FOR THE MEASUREMENT OF THE LAYER THICKNESS OF A MULTI-LAYER PIPE

(75) Inventors: Finn Fallentin Olesen, Skænsved (DK); Jørgen Fink, Frederiksberg (DK); Bill Sejer Nielsen, Hammel (DK)

(73) Assignees: Sciteq-Hammel A/S, Hammel (DK); FORCE Technology, Brøndby (DK)

( * ) Notice: Subject to any disclaimer, the term of this patent is extended or adjusted under 35 U.S.C. 154(b) by 0 days.

(21) Appl. No.: 10/475,944

(22) PCT Filed: Apr. 22, 2002

(86) PCT No.: PCT/DK02/00260

§ 371 (c)(1),
(2), (4) Date: Jun. 30, 2004

(87) PCT Pub. No.: WO02/086421

PCT Pub. Date: Oct. 31, 2002

(65) Prior Publication Data

(30) Foreign Application Priority Data

Apr. 24, 2001 (DK) ............................... 2001 00644

(51) Int. Cl.
*G01B 15/06* (2006.01)

(52) U.S. Cl. .......................................... 378/59; 378/54
(58) Field of Classification Search ............ 378/57–60, 378/62, 19, 98.8; 250/370.09, 370.11
See application file for complete search history.

(56) References Cited

U.S. PATENT DOCUMENTS

| | | | |
|---|---|---|---|
| 4,457,009 A | 6/1984 | Botden | 378/19 |
| 4,560,877 A | 12/1985 | Hoffman | 250/366 |
| 4,574,387 A | 3/1986 | Gignoux et al. | 378/56 |
| 4,590,658 A | 5/1986 | Funyu et al. | 29/464 |
| 4,725,963 A * | 2/1988 | Taylor et al. | 702/40 |
| 4,731,534 A | 3/1988 | Klein et al. | 250/366 |
| 5,414,648 A | 5/1995 | Morgan et al. | 364/563 |
| 6,304,626 B1 * | 10/2001 | Adachi et al. | 378/19 |

FOREIGN PATENT DOCUMENTS

| | | |
|---|---|---|
| DE | 3327267 | 2/1985 |
| EP | 0216705 | 1/1987 |
| EP | 1072861 | 1/2001 |
| GB | 2146115 | 4/1985 |
| GB | 2290138 | 12/1995 |

* cited by examiner

*Primary Examiner*—Edward J. Glick
*Assistant Examiner*—Irakli Kiknadze
(74) *Attorney, Agent, or Firm*—Cooper & Dunham LLP

(57) ABSTRACT

System for measuring layer thicknesses of a multi-layer pipe by measuring with a detector array (2) the attenuation of an X-ray transmitted though the pipe. According to the invention the detector array (2) comprises an array of detector elements $D_1$, $D_2$, $D_3$, $D_4$ with a collimator for defining the field of radiation in front of each detector element. The collimator has a narrow diaphragm aperture setting the resolution when the position of the pipe walls is to be determined. The defined field of radiation has an extent sufficient to radiate the four detector elements $D_1$, $D_2$, $D_3$, $D_4$ in parallel. In a suitable signal processing of the output signals from the detector elements $D_1$, $D_2$, $D_3$, $D_4$, eg by using the method of least squares, the thicknesses of the different layers may be fairly accurately determined.

7 Claims, 8 Drawing Sheets

SYSTEM AND METHOD FOR THE MEASUREMENT OF THE LAYER THICKNESS OF A MULTI-LAYER PIPE

TECHNICAL FIELD

The invention relates to a system for the measurement the layer thicknesses of a multi-layer pipe by measuring with a detector array the attenuation of an X-ray transmitted through the pipe.

BACKGROUND ART

A system for examining plastic pipes by means of an X-ray transmitted through the pipe is known from EP 216.705. This system is, however not able to render a sufficiently high resolution. Furthermore it is not possible to compensate for pipe fluctuations (vibrations) occurring during such a measurement, eg in connection with an online measurement of a through-going pipe.

DESCRIPTION OF THE INVENTION

The object of the invention is to provide a system, which in contrast to known systems has a unique resolution as well as such a high sensitivity that an accurate determination of the layer thicknesses and/or densities for measuring layer thicknesses of pipes is obtained.

According to the invention a measuring system of the above type is characterised in that the detector array comprises scintillation counters arranged in pairs with a collimator for defining a field of radiation in front of each scintillation counter and a thin leaded scintillation disc being arranged at the end of each scintillation counter, the pairs of the scintillation counters being displaced in relation to other. The detector collimator has a narrow diaphragm aperture setting the resolution when the positions of the pipe walls are determined. The defined field of radiation further extend such that all detector elements are radiated parallel to each other. At a suitable signal processing of the output signals from the adjacent detector elements, the thickness of the individual layers may be determined fairly accurately.

Furthermore according to the invention the collimator may have a narrow diaphragm aperture provided in a thin plate, eg a tantalum plate being for instance 1 mm thick. Each diaphragm aperture in the thin plate may thus have a gap width of about 50 μm. One advantage of using a tantalum plate is that a comparatively thin plate maybe used, while still obtaining sufficient shielding at the same time as the thin plate is fairly easily workable.

Moreover, according to the invention it is possible to compensate for fluctuations in the pipe's position at an online measurement of the characteristics of the pipe wall.

Finally according to the invention the amplitude of the pipe vibration may be determined by measuring the deviation between the actual time of detection of a pipe wall and the expected time for detection the same pipe wall.

The invention further relates to a method for measuring layer thicknesses of a multi-layer pipe by measuring with a detector array the attenuation of an X-ray transmitted though the pipe. The method is characterised in that the used detector array is formed of detector elements arranged in pairs with a collimator for defining the field of radiation in front of each detector element, the layer thicknesses and/or the densities of each layer of a multi-layer pipe being determined by means of a simulation calculation based on a model, in which the values of the layer thicknesses and/or the densities, respectively, are optimally adjusted.

BRIEF DESCRIPTION OF THE DRAWINGS

The invention is explained in greater detail below with reference to the accompanying drawings, in which.

BEST MODES FOR CARRYING OUT THE INVENTION

Figure 1:
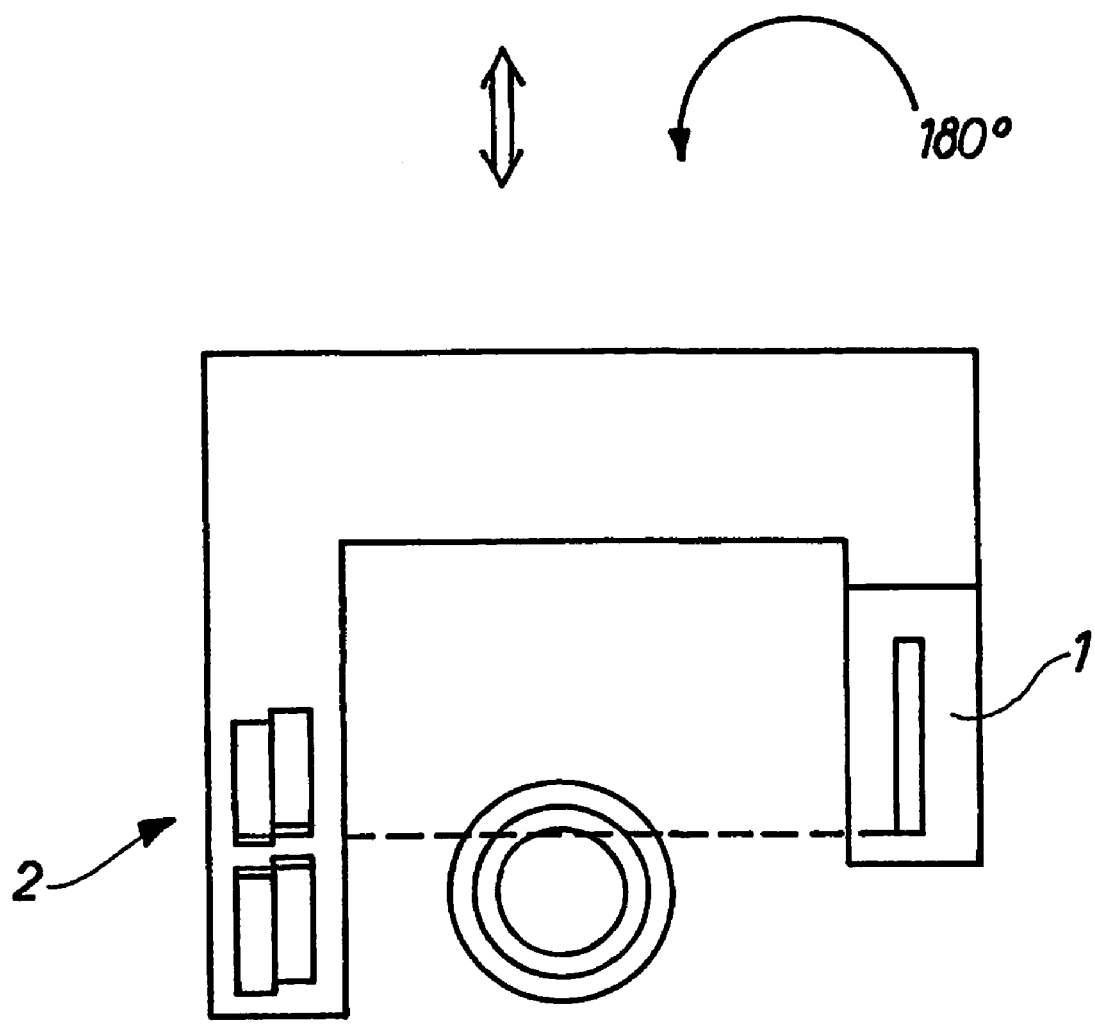
FIG. 1 shows a measuring equipment according to the invention including an X-ray source and a detector array with associated signal analysis means.
Figure 2:
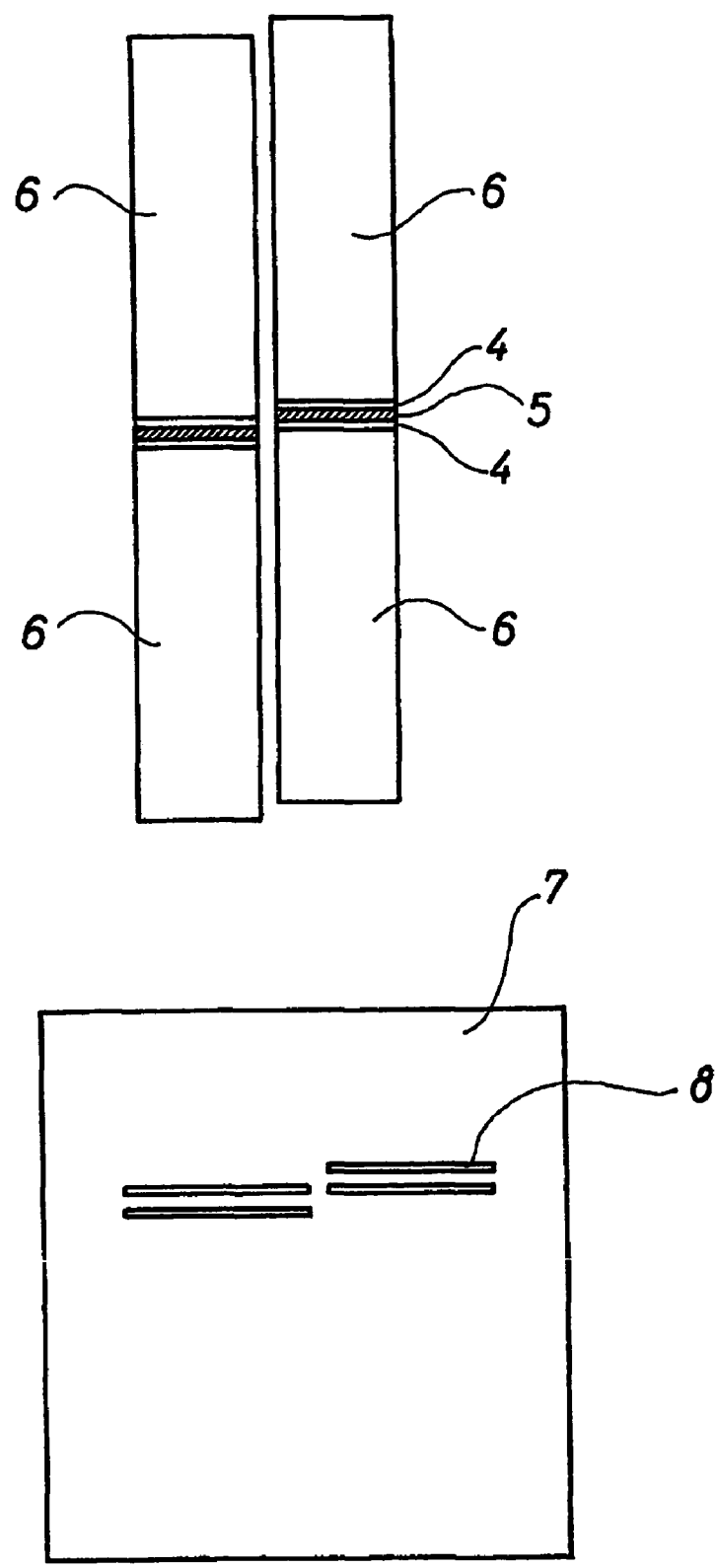
FIG. 2 shows the detector array with associated diaphragm apertures.

The measuring equipment shown in FIG. 1 for measuring layer thicknesses of multi-layer pipes by measuring the attenuation of an X-ray transmitted through the pipe include an X-ray source 1 and a detector array 2 with associated signal analysis means for instance in form of a personal computer (PC). The detector array 2 is formed of a n-element array with a collimator to define the field of radiation in front of each detector element. In a specific embodiment the detector array 2 is formed of four cylindrical scintillation counters 6 (confer FIG. 2), a leaded plastic scintillator 4 being arranged at the end of each of the scintillation counters 6. When the plastic scintillator 4 is hit by an X-ray, a flash of light is emitted, which is amplified by the scintillation counter 6 and advanced to a subsequent electronic unit. A 0.2 mm thick leaded plate is arranged on the plastic scintillator 4, said plate serving as a support for an additional detector element such that a pair of detector elements is formed. Two such pairs of detector elements are juxtaposed, one pair, however, being slightly longitudinally displaced in relation to the other pair by a distance of about 0.5 mm. All of the detector elements are arranged in a housing covered by a tantalum plate 7 with four diaphragm apertures 8. The thickness of the tantalum plate 7 may for instance be 1 mm. These diaphragm apertures 8 serve as collimator openings. Each collimator opening 8 has a gap width? SW determining the resolution when the position of a pipe wall is determined. In a specific embodiment each diaphragm aperture 8 has an area of 50 μm×20 mm. The defined field of radiation has an extent sufficient to radiate the four detector elements $D_1$, $D_2$, $D_3$, $D_4$ parallel to each other. Each detector element has a detection efficiency of 80–100%.

The space between the collimator openings 8 (the detector elements) is denoted SD.

The detector array 2 and the X-ray source 1 are arranged in a frame 3 and scan the pipe being measured at a rate SS. The frame 3 is rotatable and displaceable in relation to the pipe. All detector elements are read in parallel and at a sampling frequency sufficiently high to obtain at least ten samplings over a scanning length corresponding to the gap width SW. If the gap width SW is 0.05 mm and the scanning rate SS is 1 mm/sec, a sampling frequency exceeding SS/0.5 SW=40 samplings/sec. is advantageous.

Measurement data are collected from each of the detector elements to obtain a total pipe scanning. The inner and outer surfaces (inner and outer radiuses) of the pipe wall are primarily determined by means of methods for detecting and positioning density transitions, said methods being explained below. At the time $t_0$ (confer FIG. 3) the first detector element $D_1$ detects the outer wall. At the times $t_1$, $t_2$ and $t_3$ the same outer pipe wall is detected by the detector elements $D_2$, $D_3$ and $D_4$. The inner wall of the pipe's casing is detected by the shown detector elements at the times $t_4$, $t_5$, $t_6$ and $t_7$. The thickness of the pipe wall is calculated on the basis of the deviation between detected positions of the outer wall and the inner wall. This is rendered as $w_1$, $w_2$, $w_3$, $w_4$ for the four detector elements $D_1$, $D_2$, $D_3$, $D_4$. The result of the four scannings may then be averaged to obtain a more statistically correct measurement. In this context the inner wall denotes a local density transition during the transmission measurements. Correspondingly a local density transition may be the transition between different layers in the pipe wall of a multi-layer pipe. If the pipe wall comprises several different layers of varying densities, the transitions therebetween may thus be treated equally in subsequent compensation processes.

First Compensation Process

The object of the compensation process is to significantly improve the resolution, the sensitivity and the signal/noise ratio.

The position for detecting the outer wall of a pipe is compensated for the edge detection signal of each detector element such that the intervals between the times $t_0$ and $t_1$, $t_1$ and $t_2$, $t_2$ and $t_3$ remain the same. The above is performed by adding a time difference (positive or negative) to the indicated signals $D_1 \ldots D_4$. The mean value of the pipe wall thickness is then calculated and each curve is expanded or compressed on the time axis such that the edge detection signal for the pipe inner wall is positioned at the spot on the time axis. The signals for each of the detector elements $D_1$, $D_2$, $D_3$, $D_4$ may then be added or averaged to obtain a statistically optimised measurement result.

Second Compensation Process

The object of the compensation process is to compensate for pipe fluctuations. The compensations are based on a measurement of the amplitude values and the time value for the edges and a passing of the individual array elements. The measurement data are repositioned on the basis of these values so as to eliminate influences from the pipe fluctuations.

Figure 3:
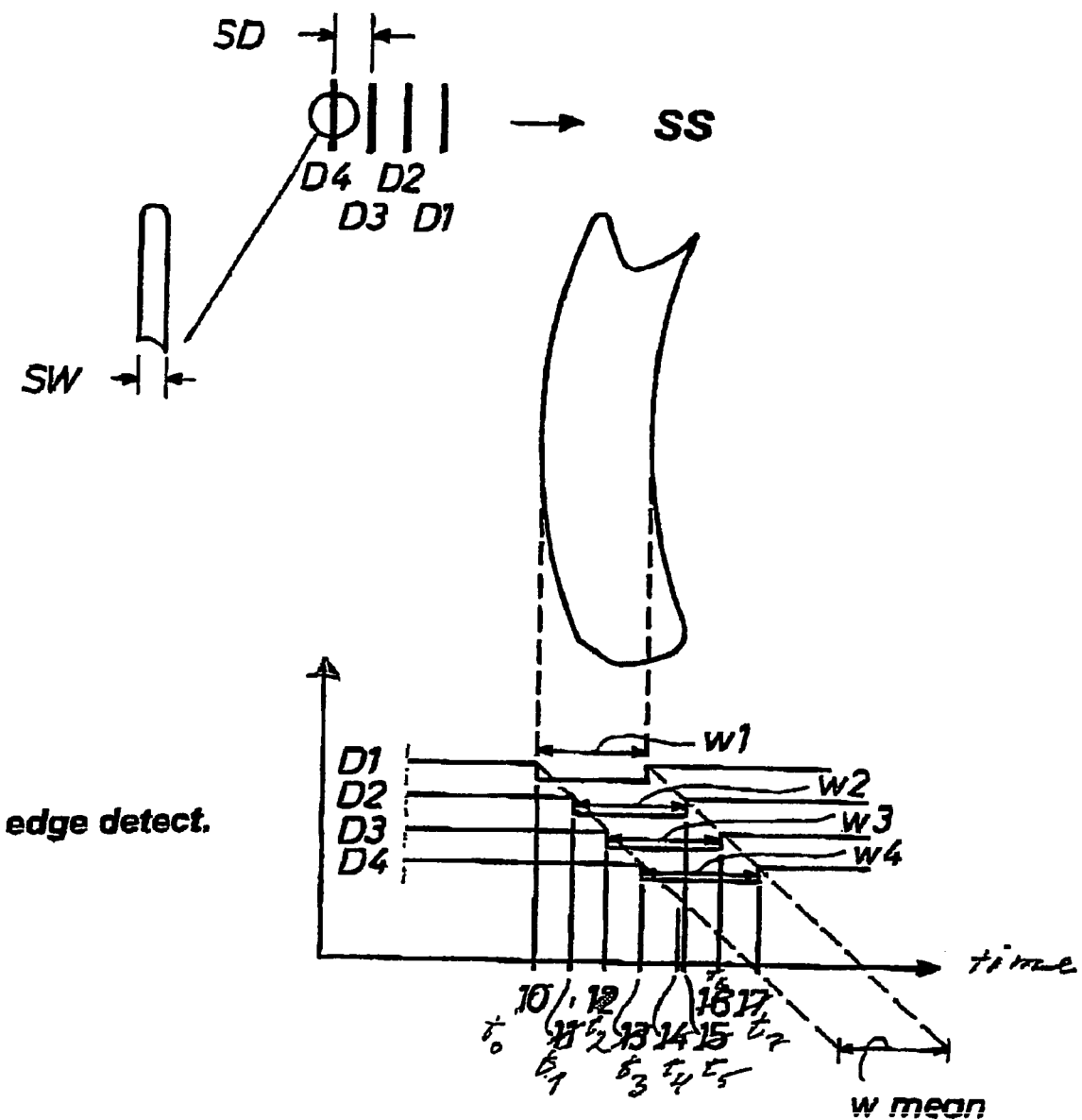
FIG. 3 shows an example of measuring signals from the detector array.
Figure 4:
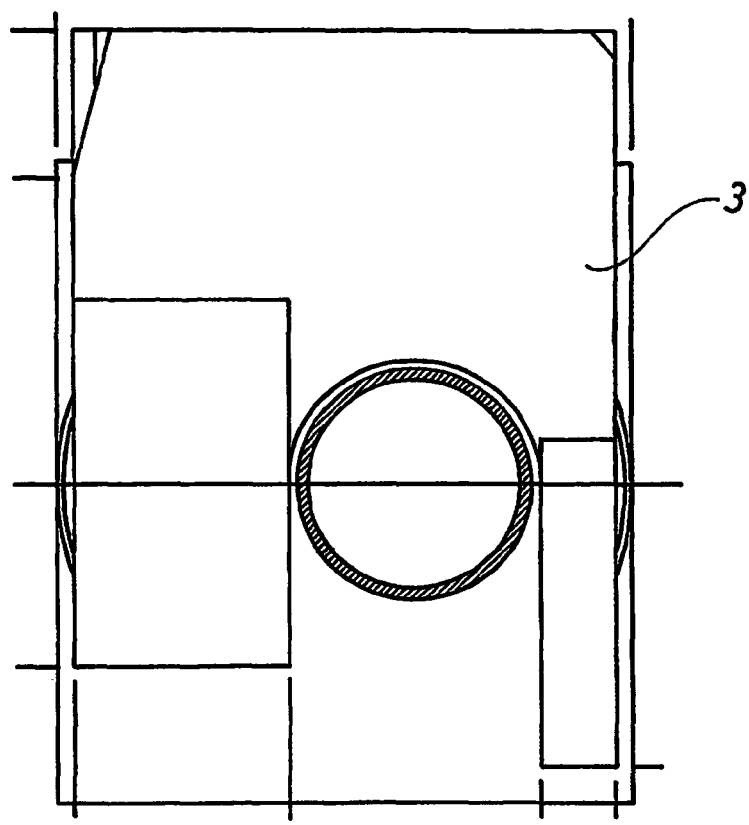
FIG. 4 is a front and a side view of a bracket for supporting the measuring equipment.
Figure 4:
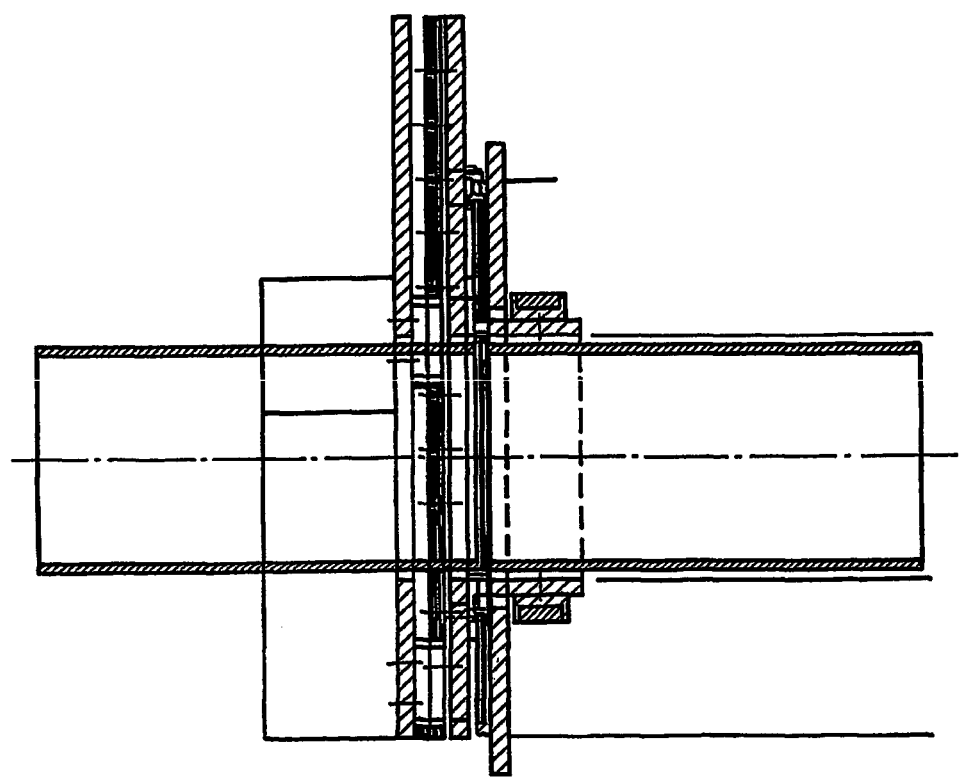

The pipe vibration amplitude $V_a$—confer FIG. 3—is determined by measuring the deviation between the actual time for detecting a pipe wall and the expected time for detecting the same pipe wall, provided the vibration/fluctuation is equal to zero. The vibration amplitude is found by comparing this difference to the gap width SW and the scanning rate SS amplitude of the vibration.

The measuring position on the time axis should follow the time intervals of expected pipe edge measurements (measuring frequency or sampling frequency). At each edge n−1 samplings are rendered, where n is the number of detector elements $D_1$, $D_2$, $D_3$, and $D_4$ in the detector array 2.

In this context the above measuring frequency is regarded as the sampling frequency not to be confused with the detection rate of the detectors.

At a frequency analysis the basic frequency, the amplitude and the phase of the pipe's vibration may be determined by means of n−1 samplings at each edge (or density transition). At the time t the edge detection signals may subsequently be compensated for the vibration of the pipe, whereby a correct radial density profile of the pipe wall is obtained.

At an online scanning of a plastic pipe comprising several layers, the layer thickness, the pipe wall thicknesses are determined as follows:

The measuring principle is based on a recordal of transmitted radiation in an idealised (narrow-collimated) transmission geometry. The scanning is performed radially and the measurement data is the position in relation to the radius of the object being measured. The measurement data represents the area weight of a volume element of the object, which is defined by two mutually separate chords of the circle of the pipe and the distance between the chords represents the resolution. The resolution is typically 10 µm or 100 measurements per scanned mm. The entire diameter of the pipe is scanned, ie for an online determination of the diameters of the pipe.

For determining the layer thickness and thus the separation between the different layers, the transitions between the different material characteristics are to be located, eg between two different densities and/or layers transitions with attenuation cross sections being different from each other with regard to radiation.

Figure 5:
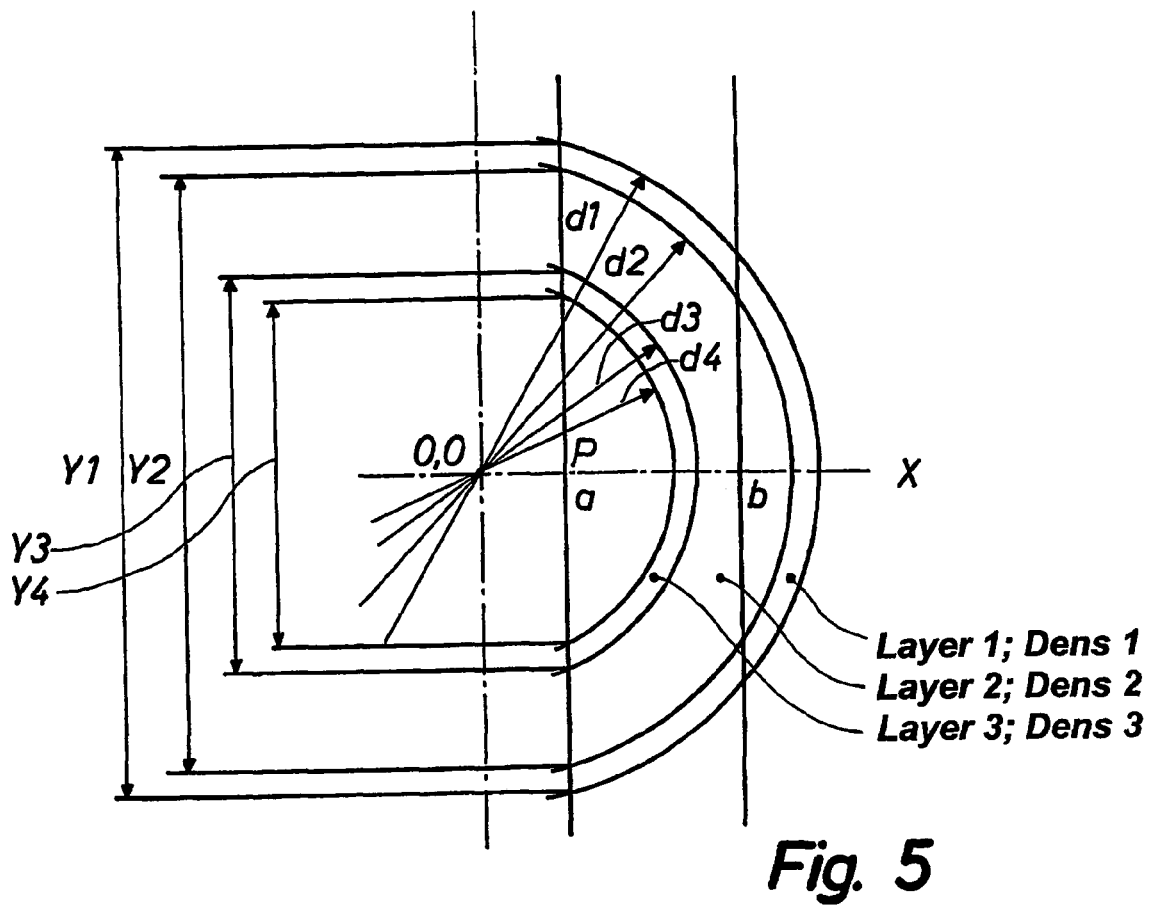
FIG. 5 is a model of a multi-layer pipe.

For this purpose a model of a multi-layer pipe has been designed—confer FIG. 5. By means of this model a reference signal is calculated at a given position of the radial cross section of the pipe. The centre of the pipe has the coordinates 0,0. The reference signal is the radiation intensity I at the detector as a function of the following parameters:

P The position of the pipe's radius, where the measurement is performed, $d_1$–$d_4$ The diameters of the different layers of the pipe, Dens 1–3 The densities of the different layers.

µ(Alpha) The mean absorption coefficient at "low area weight",

µ(Beta) The correction absorption coefficient at "high area weight",

The model is illustrated in FIG. 5.

The signal I is calculated by means of the formula:

$$I = I_o * e^{-\mu(res) * AW(tot)}$$

where $I_0$ is the measuring signal at an area weight? of 0, and µ(res) is the resulting absorption coefficient and AW(tot) is the total area weight.

For the position P corresponding to the distance a from the centre the following is calculated:

the length of the chords $Y_1$, $Y_2$, $Y_3$ and $Y_4$ based on the diameters $d_1$, $d_2$, $d_3$ and $d_4$. The total area weight AW(tot) is equal to the sum of the area weights of the different layers and is expressed as AW(tot)=AW(layer1)+A(layer2)+AW(layer3).

Figure 6:
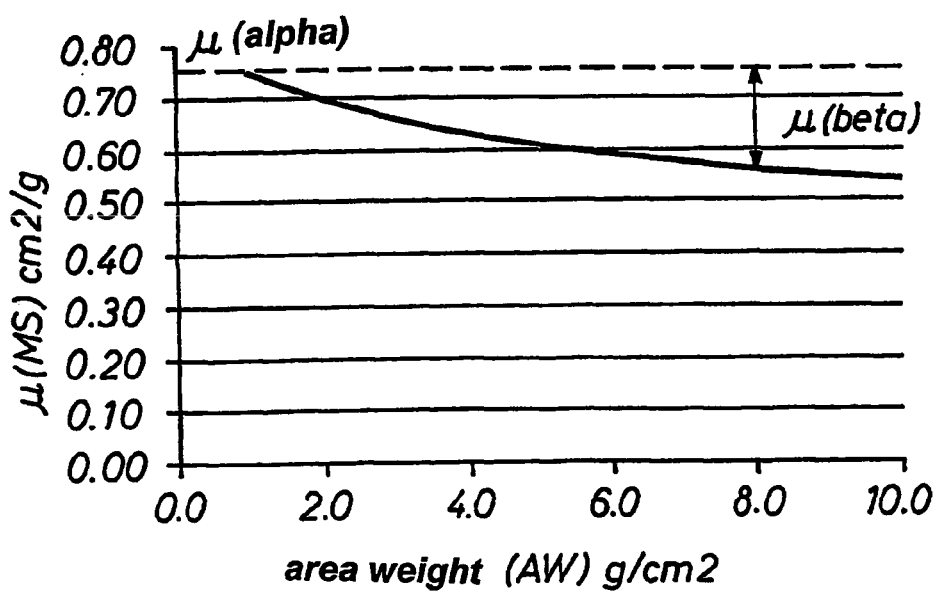
FIG. 6 shows the absorption coefficient as a function of the area weight.
Figure 7:
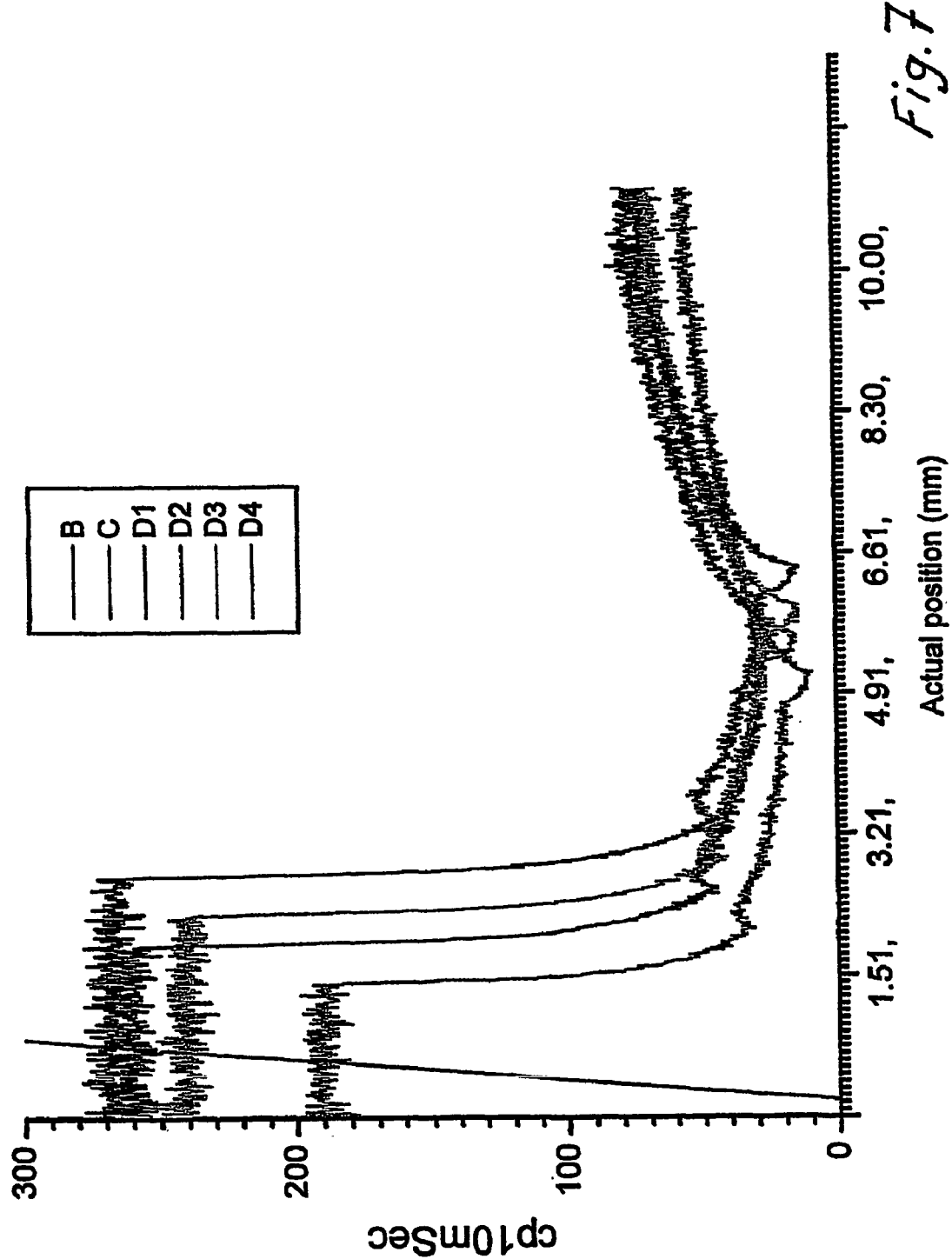
FIGS. 7–9 shows examples of measured curves.
Figure 8:
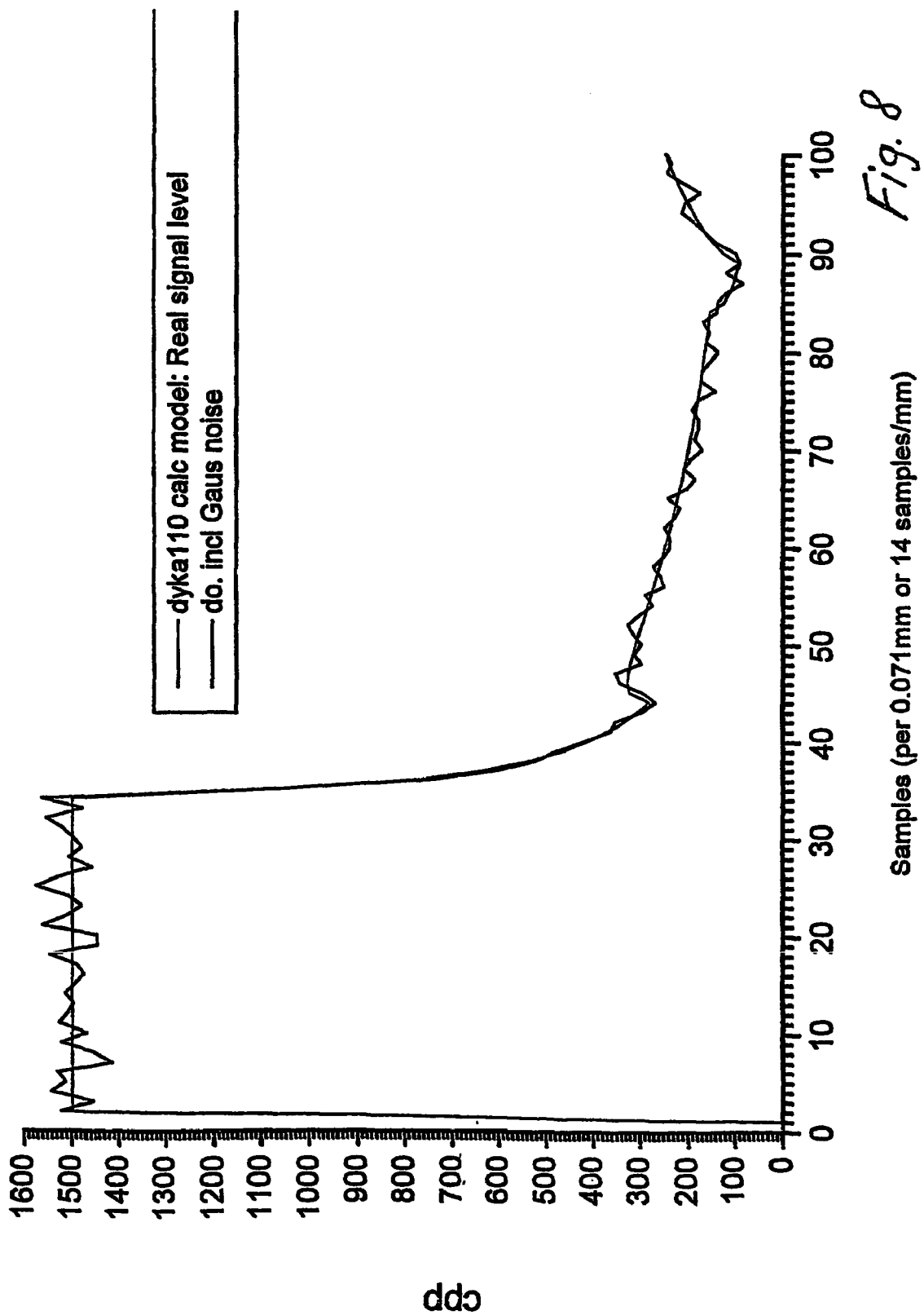
Figure 9:
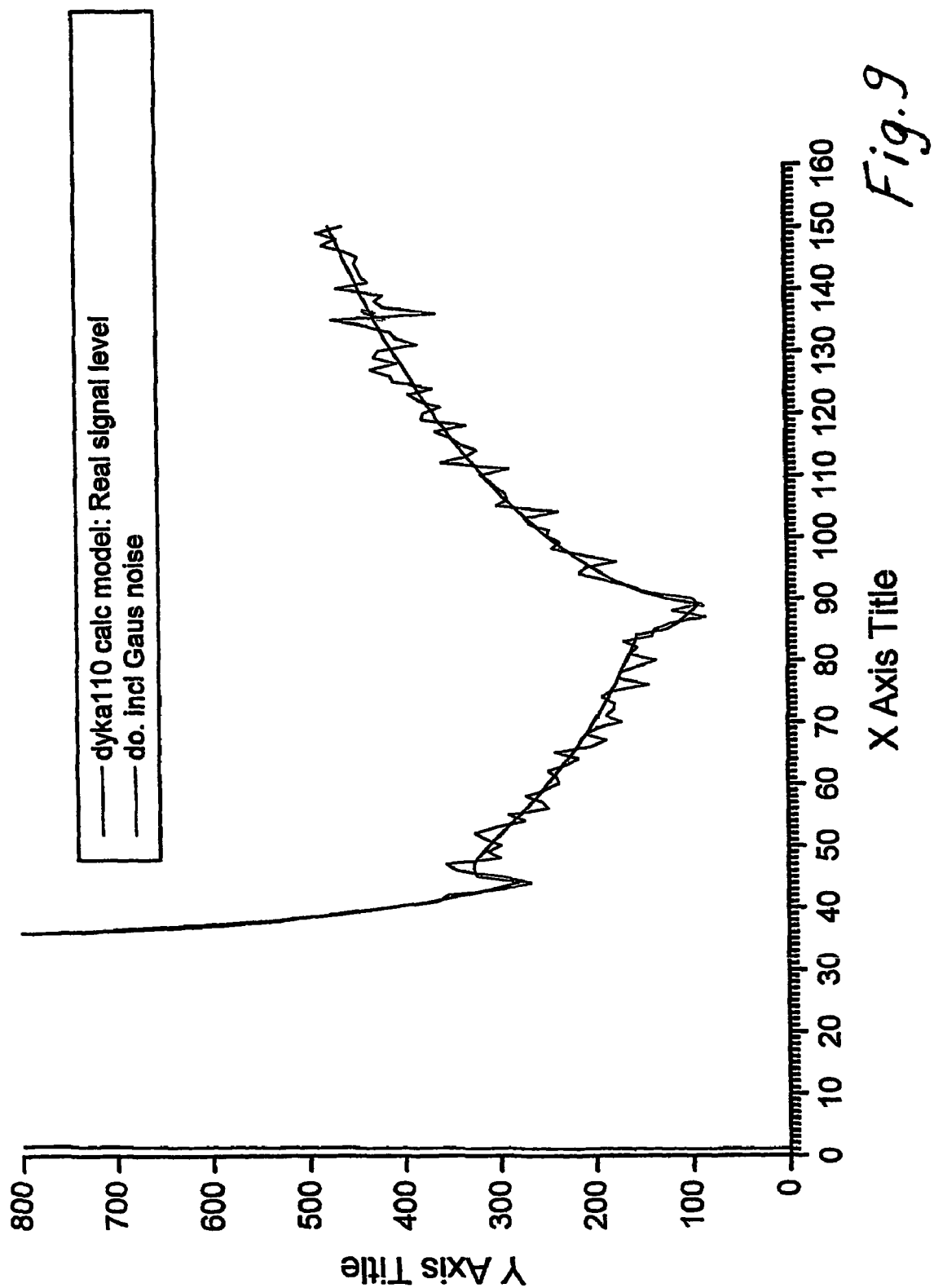

The resulting area weight corresponding to the position P is $AW(tot)_a = (Y_1 - Y_2) * Dens1 + (Y_2 - Y_3) * Dens2 + (Y_3 - Y_4) * Dens3$. The calibration absorption coefficient $\mu(res)_a$ is calculated on the basis of the values rendered by the absorption coefficients (Alpha) and µ(Beta), where (Alpha) is determined on the basis of the material composition of the pipe, the power spectrum contents of the X-rays and the measuring geometry. µ(Beta) serves to correct (Alpha) depending on the area weight to obtain µ(res).

µ(res) is then determined on the basis of µ(Alpha), which is to be corrected in accordance with the area weight based on the curve in FIG. 6 or based on an approximate linear function of area weights between for instance f . . . 2 and 10 g/cm², confer FIG. 6.

The following combinations are used:
1. Direct measurement.
2. Parameter limitation either based on a product library and/or use of directly measured parameters.
3. Determination of parameters by means of a model prediction to establish "the most likely combination" by comparing the model prediction with measured sets of data using the method of least squares.

At each measurement the entire pipe diameter is scanned and the measurement data I is recorded with the actual positions.

After each scanning the measurement data are normalised to provide a data course indicating cpp (counts per period) as a function of the position.

$d_1$ (outer diameter), $d_4$ (inner diameter) and optionally also $d_2$ are determined at an analysis of the signal and by scanning for "local extremes" in form of level transitions in the signal indicating local density transitions in the pipe.

Dens1 (density of the outermost layer) is also determined by a direct measurement and all directly measured parameters are then taken into account at the final determination of the parameter sets according to "the method of least squares".

Based on these calculations, the diameters $d_1$, $d_4$ and optionally also $d_2$ as well as Dens1 are rendered as directly measured parameters.

$d_2$ and $d_3$ as well as Dens2 and Dens 3 are rendered as the most likely parameters after the model predictions. When all diameters have been determined, the layer thicknesses therethrough are also established.

The "most likely combination of parameters" is determined as follows:

The parameters $d_2$, $d_3$ and Dens 2 and Dens 3 are desirably determined by means of the principle of the method of least squares.

The input data set is a set of data representing measured signals (cpp) at a given position P in the radial cross section (FIG. 5).

The model prediction follows the function stated below:

$$I = I_0 * e^{-\mu(res)*AW(tot)}$$

where $$AW(tot)_a = (Y1-Y2)*Dens\,1 + (Y2-Y3)*Dens2 + (Y3-Y4)*Dens\,3$$

and

μ(res) is calculated on the basis of the values rendered for μ(Alpha) and μ(Beta) based on FIG. 6.

Y1, Y2, Y3 and Y4 are chord lengths, which may be calculated on the basis of the variable parameters d1, d2, d3 and d4.

Dens 1, Dens 2 and Dens 3 are also variable parameters.

d1, d4 and Dens 1 are determined at direct measurements.

As a result, the following parameters are rendered in position P: d2 and d3 as well as Dens 2 and Dens 3.

The set of parameters a is then determined by use of the Levenberg-Marquardt algorithm, where the means squared error (MSE) is obtained from the formula:

$$mse = \frac{\sum_{i=0}^{n-1}(yi - f(xi, a))^2}{n}$$

where yi is the input value for the position i; f(xi, a) is the model function value in the same position with the parameter set a (comprising d2, d3, Dens 2 and Dens 3), and n is the number of samplings in the data set.

By the use of this method an educated guess is used to determine the initial parameters. MSE is then calculated by means of the stated formula. Subsequently thereto the first parameter is varied in small steps, until MSE adopts a minimum. A good indication of the first parameter is thus obtained which is subsequently used. The second parameter is then varied, until MSE adopts a minimum. A good indication of the second parameter is thus obtained which is subsequently used. When the above steps have been performed in relation to all the parameter values and a set of parameter values has been found, the new set of parameter values is used as an improved educated guess of the initial parameters when the process is repeated.

This process is really an iteration process which preferably should converge. The process is continued until all parameters have been determined with the desired accuracy. The iteration sequence may, however, be varied in many ways. The iteration merely has to be able to converge. MSE and the found parameters are subsequently estimated qualitatively and a possible new initial guess may result in a new calculation sequence. This process is repeated a number of times until the results obtained are acceptable.

It should be noted that the multi-layer pipes in question not necessarily are inflexible.

The invention claimed is:

1. System for the measurement of the layer thicknesses of a multi-layer pipe comprising a detector array (2) for measuring the attenuation of X-ray transmitted through the pipe, the detector array (2) comprising scintillation counters arranged in pairs with a collimator for defining a field of radiation in front of each scintillation counter, a leaded scintillation disc (4) being arranged at one end of each scintillation counter, characterised in that the two detector pairs are juxtaposed, one detector pair, however, being longitudinally displaced in relation to the other detector pair.

2. System according to claim 1 characterised in that the one detector pair is longitudinally displaced by approximately 0.5 mm in relation to the other detector pair.

3. System according to claim 1, characterised in that a lead plate (5) is arranged on the scintillation disc (4), said lead plate (5) serving as a support for an additional detector so as to provide a detector pair.

4. System according to claim 1, characterised in that the collimator has a diaphragm aperture (8) provided in a thin plate (7) of a thickness of 1 mm.

5. System according to claim 4, characterised in that the thin plate (7) being composed of tantalum.

6. System according to claim 4, characterised in that the diaphragm aperture (8) in the thin plate (7) has a gap width of about 50 μm.

7. Method for measuring layer thicknesses or densities of a multi-layer pipe by measuring with a detector array the attenuation of an X-ray transmitted though the pipe, characterised in that the used detector array comprises detector elements arranged in pairs with a collimator for defining the field of radiation in front of each detector element, the layer thicknesses and/or the densities of each layer of a multi-layer pipe being determined by means of a simulation calculation based on a model, in which the values of the layer thicknesses and/or the densities, respectively, are optimally adjusted; in that fluctuations, such as vibrations in the pipe's position are compensated for at an online measurement of pipe wall characteristics; and in that an amplitude of the pipe vibration is determined by measuring an deviation between an actual time of detection of a pipe wall and an expected time of detection of the same pipe wall.

* * * * *